United States Patent [19]

Kersten

[11] 3,936,142
[45] Feb. 3, 1976

[54] COUPLING ARRANGEMENTS BETWEEN LIGHT CONDUCTIVE FIBERS AND BETWEEN LIGHT CONDUCTIVE FIBERS AND TERMINAL EQUIPMENT

[75] Inventor: Ralf Kersten, Munich, Germany

[73] Assignee: Siemens Aktiengesellschaft, Berlin and Munich, Germany

[22] Filed: Aug. 7, 1974

[21] Appl. No.: 495,419

[30] Foreign Application Priority Data
Aug. 7, 1973 Germany............................ 2340019

[52] U.S. Cl.............................. 350/96 C; 350/96 R
[51] Int. Cl.².......................................... G02B 5/14
[58] Field of Search.............. 350/96 C, 96 R, 96 B, 96 WG; 250/227

[56] References Cited
UNITED STATES PATENTS 2,586,723  2/1952  Sakols................................ 350/96 R
3,798,099  3/1974  Marcatili............................ 350/96 C
3,870,395  3/1975  Schicketanz...................... 350/96 C

OTHER PUBLICATIONS

Bisbee, D. L., "Optical Fiber Joining Technique," B.S.T.J., Vol. 50, No. 10, Dec., 1971, pp. 3153-3158.

*Primary Examiner*—Alfred E. Smith
*Assistant Examiner*—Jon W. Henry
*Attorney, Agent, or Firm*—Hill, Gross, Simpson, Van Santen, Steadman, Chiara & Simpson

[57] ABSTRACT

The invention relates to a coupling assembly between sheathed light conductive fibers. The invention also relates to a coupling assembly between light conductive fibers and the requisite terminal equipment. The invention further provides for such manipulative coupling without the necessity of making precise adjustments for the attainment of a high efficiency coupling.

23 Claims, 8 Drawing Figures

Fig. 2a  Fig. 2b
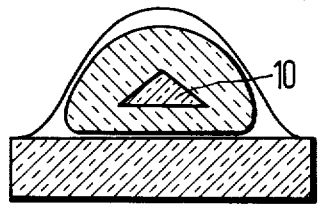
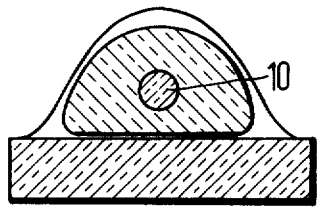
Fig. 2c
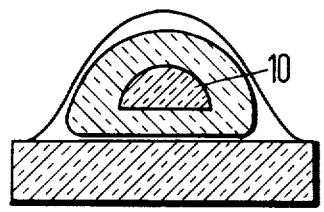
Fig. 4
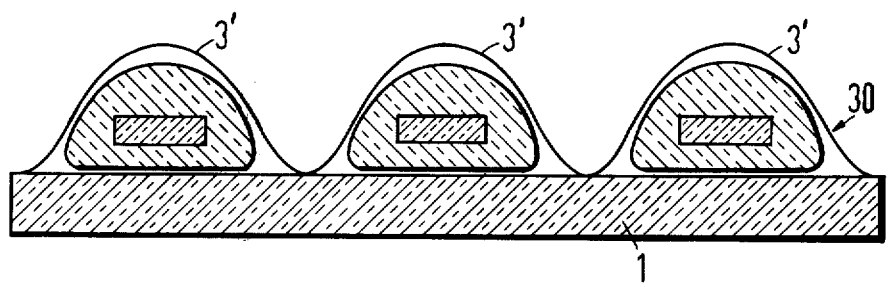
Fig. 5
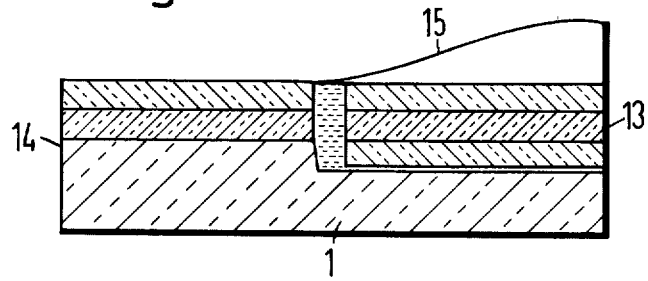

COUPLING ARRANGEMENTS BETWEEN LIGHT CONDUCTIVE FIBERS AND BETWEEN LIGHT CONDUCTIVE FIBERS AND TERMINAL EQUIPMENT

BACKGROUND OF THE INVENTION

1. Field of the Invention

Light conductive fibers have external diameters ranging between 50 and 150 $\mu$. The transmission of light energy is restricted to the core of the fiber and to its immediate neighborhood; wherein, the core dimensions comprise diameters of only a few microns. Because of the small dimensions of the fiber cores, the process of connecting the light conductive fibers to each other or connecting the light conductive fibers to terminal equipment having very small light exit or entry areas is painstakingly difficult and extreme precision is required in order to avoid lateral offset between the connecting elements.

2. Prior Art connecting plugs for connecting two glass fibers are known to the art. These comprise a capillary tube with an internal diameter slightly larger than the external diameter of the corresponding fiber to be connected. Increasing steadily in an outward direction, the glass fibers to be connected are introduced into the internal diameter of the capillary tube in such a fashion that the two fiber ends touch one another in the central section of the capillary tube. In order to achieve a high coupling efficiency, precise adjustments are required at this point so that the end portions of the two cylindrical glass fibers come to be located precisely in the short zone of the plug, which has the smallest internal diameter, so that the fiber axes are not offset in relation to one another.

In an article which appeared in NTZ, edition 10, 1972, pages 452 to 455, S. Maslowski describes a detachable plug-in connection for fiber optic wave guides, which exhibits coupling losses of less than 0.4 dB. The fibers are held eccentrically in pins which are in turn eccentrically guided in bushings. By rotating the pins in relation to one another, optimum coupling of the fiber ends can be manualy effected with adequate precision. However, this precise adjustment can only be achieved by trial and error.

SUMMARY OF THE INVENTION

The object of the present invention is to provide a means for coupling light conductive fibers with one another and for interfacing light conductive fibers with the requisite terminal equipment. The invention further provides for such manipulative functions without the necessity of making precise adjustments to achieve a high efficiency coupling.

The object of the invention is realized by an improved light conductive fiber assembly comprising a sheath region at each end portion having annular cross sectional areas, a core region having cross sectional base located parallel to the semi-circular cross sectional areas of the sheath region, and a plug sleeve. The plug sleeve comprises a solid parallelopiped, polished, flat surfaced base and an elastic upper portion attached thereto having a longitudinal flare decaying in a direction away from each end face of said plug sleeve; and exerting a force in the direction of the base portions. A longitudinal opening centrally extending between the base and the upper portion of the plug sleeve accommodates the light conductive fibers. The longitudinal opening, externally flared at the periphery of the upper portion of the plug sleeve, is centrally adapted to facilitate its interfacing to the cross sectional areas of the light conductive fibers.

Because the light conductive fibers are attached vertically, something which is achieved through the interaction of the flat boundary surfaces of the fibers and the sleeves, connections can be permanently or portably engaged and disengaged with relative ease. A slight lateral offset in the fibers is unimportant in relation to the coupling efficiency because of the width of the core region. Because of the assymmetrical cross sectional area of the light conductive fibers at their end portions, incorrect insertion of the fibers into the plug is excluded.

The plugs are designed in accordance with the application, as either single or multiple plugs.

In communication transmission links, such as in integrated form, the light conductive fibers have the requisite cross sectional shape for the purposes of plug-in connection over their entire length.

The plug sleeve offers particular advantage as a connecting component for a light conductive fiber with an optical layer conductor.

If coupling is to be established between the light conductive fibers and the requisite terminal equipment, such as a light transmitter, an amplifier, a modulator or a receiver, then this terminal equipment may advantageously be integrally interfaced along with the plug sleeve.

To increase the coupling efficiency, an immersion liquid having suitable adhesive and optical properties may be introduced in the coupling zone to provide for a firm connection.

BRIEF DESCRIPTION OF THE DRAWINGS

FIG. 2a is a diagrammatic cross sectional view of the light conductive fiber depicting a core region having a triangular cross section;

FIG. 2b is a diagrammatic cross sectional view of the light conductive fiber depicting a core region with a circular cross section;

FIG. 2c is a diagrammatic cross sectional view of the light conductive fiber depicting a core region with a semi-circular cross section;

FIG. 4 is a diagrammatic view of a plug sleeve intended for interfacing of three light conductive fibers;

FIG. 5 is a diagrammatic view depicting the coupling of a light conductive fiber with an optical slab or strip waveguide.

DESCRIPTION OF THE PREFERRED EMBODIMENT

Figure 1:
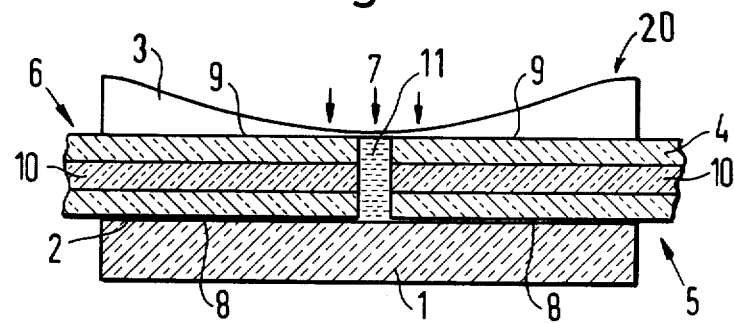
FIG. 1 is a diagrammatic view of a longitudinal cross section through a single plug sleeve for connecting to a light conductive fiber in accordance with the invention.

A coupling assembly 1a as best seen at FIG. 1 includes a solid base portion 1, made of some crystalline substance such as glass, having a polished flat surface 2, a convex upper portion 3 having a longitudinally flared platinum sheet decaying in a direction away from each end face of said plug sleeve, connected to the base portion 1, and at least a pair of light conductive fibers 5 and 6 each having an internal and external face. The platinum sheet 3 is contoured to the profile of a surface wall and sheath region 4 as shown in FIG. 2 of light conductive fibers 5 and 6 by the compressive force generated in the direction of arrow 7 by the elastic component of the platinum sheet 3 as best seen at FIGS. 1 and 2.

Figure 2:
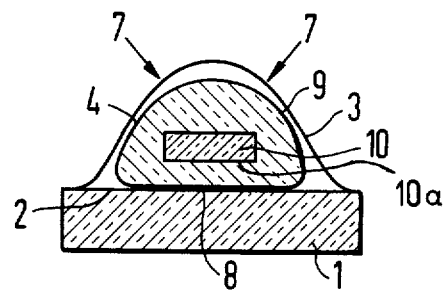
FIG. 2 is a diagrammatic cross sectional view of the light conductive fiber in accordance with the invention.

The cross section of the light conductive fibers 5 and 6 as best seen at FIGS. 2 through 2c comprises a straight base portion 8, and a convex upper profile 9. The compressive force exerted upon the fibers forces the straight base portion 8 against the corresponding flat surface 2 of the base portion 1 of a plug sleeve 20.

A core region 10 of the light conductive fibers has a cross section, the longest side 10a of said cross section being parallel to both the flat base portion 8 of the light conductive fiber and surface 2 of the base portion 1. The cross section of the core region may be rectangular, triangular, circular or semi-circular, as best seen at FIGS. 2a through 2c, dependent only on the physical efficacy.

Because of the press fit of the light conductive fibers in the plug sleeve, stagger between the two light conductive fibers is minimized. Because of the width of the core region 10, a minor lateral offset has no effect upon the transmission of an incident light wave through the core.

It should be pointed out that instead of a single core region as shown in FIG. 2, it may be desirable to provide several rectangular core regions in a given sheath region, disposed serially and at the same height, as best seen at FIG. 4, or to vary the geometric profile of the core region 10 as indicated in FIGS. 2a through 2c. In this fashion, it is then possible to connect together multiple light conductive fibers by using a corresponding plug sleeve. In FIG. 4 a plug sleeve 30 capable of receiving three light conductive fibers is illustrated wherein, the fibers are disposed within three convex upper portions 3' situated upon the base portion 1.

To facilitate the interfacing operation and to further maximize the coupling efficiency, an immersion liquid 11 having suitable adhesive and optical properties, as best seen at FIGS. 1 and 5, is provided between the end portion of the light conductive fibers 5 and 6.

Figure 3:
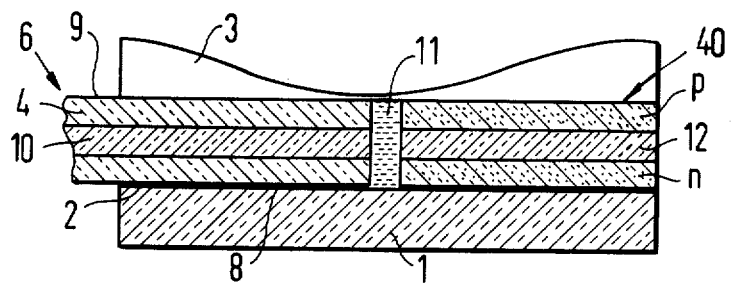
FIG. 3 diagrammatically illustrates a cross section of a plug sleeve for connecting a light conductive fiber with a laser transmitter.

The coupling assembly may also be utilized in interfacing light conductive fibers with terminal equipment such as a laser as indicated in FIG. 3 wherein a coupling arrangement for connecting a light conductive fiber with a semi-conductor laser is illustrated. The coupling is the same as that shown in FIGS. 1 and 2, with the exception that, instead of the light conductive fiber 5 shown in FIG. 1, a transmitter 40, such as a laser transmitter, having the same dimensions as the light conductive fiber 5, and having an internal face has been permanently installed. The laser comprises a p-doped layer, an n-doped layer and a p-n-junction layer 12. The n-doped layer is attached to the first part 1 of the plug sleeve 20 and is so adjusted that the light-emitting junction layer 12 is disposed directly opposite the core region 10 of the light conductive fiber 6. An adhesive in form of the immersion liquid 11, is again employed between the terminal face of the optical fiber 6 and the laser transmitter 40.

Because of the flat interfaces between the light conductive fibers and the plug sleeve, and because of the pressure exerted upon the light conductive fiber by the platinum sheet, the fiber is always placed in the correct position even when frequent plug-in and unplugging operations are carried out. Because of the flare in the openings in the plug sleeve, at its external upper portion perimeter, it is a simple matter to insert even thin light conductive fibers into the plug sleeve, without the upper portion of said plug sleeve collapsing upon itself and making penetration into the plug sleeve impossible.

FIG. 5 illustrates a coupling of a light conductive fiber 13 with an optical slab or strip waveguide 14 integrally mounted on the base portion 1 wherein a longitudinally flared platinum sheet 15 is mounted on the end part of the optical slab strip waveguide. To establish a firm connection between the two coupling elements, the adhesive immersion liquid 11 is again employed to bond the two coupling elements tenaciously.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

I claim as my invention:

1. A coupling assembly between sheathed light conductive fibers which includes:
    at least one pair of light conductive fibers each comprising an internal and external terminal face and a sheath region at each terminal free having a straight base annular cross sectional area,
    a core region disposed within said sheath region having a cross sectional area;
    a plug sleeve comprising a solid parallelopiped, polished, flat surfaced base and an elastic upper portion archedly arranged above said base and attached thereto and having a longitudinal flare decaying in a direction away from each end face of said plug sleeve, wherein said upper portion exerts an inward compressive force directed toward said base; and
    a longitudinal opening centrally extending between the base and the upper portion of said plug sleeve to accommodate the incident light conductive fiber, wherein said opening is externally flared at a periphery of said upper portion and adapted at a center of the plug sleeve to facilitate its interfacing with the cross sectional areas of the light conductive fibers.

2. A coupling assembly as defined in claim 1, wherein said core regions of the light conductive fibers have a circular cross sectional area.

3. A coupling assembly as defined in claim 1, wherein said plug sleeve further comprises a plurality of serially connected, convex upper portions to allow for the reception of a plurality of corresponding light conductive fibers.

4. A coupling assembly as defined in claim 1, wherein said plug sleeve further comprises a means having an immersion liquid within.

5. A coupling assembly as defined in claim 4, wherein said immersion liquid includes an adhesive to maximize coupling efficiency between said light conductive fiber.

6. A coupling assembly as defined in claim 4, wherein said means having an immersion liquid within is arranged between internal terminal faces of said light conductive fibers disposed in said plug sleeve.

7. A coupling assembly as defined in claim 1, wherein said cross sectional area of said core region further comprises a straight base located parallel to the straight base of said annular cross sectionaal area of the sheath region.

8. A coupling assembly as defined in claim 7, wherein said core regions of the light conductive fibers have a rectangular cross sectional area.

9. A coupling assembly as defined in claim 7, wherein said core regions of the light conductive fibers have a triangular cross sectional area.

10. A coupling assembly as defined in claim 7, wherein said core regions of the light conductive fibers have a semi-circular sectional area.

11. A coupling assembly between a light conductive fiber and terminal equipment, wherein said coupling assembly comprises:
  at least one light conductive fiber having an internal and external terminal face and a straight base sheath region at each terminal face of annular cross sectional area,
    a core region disposed within said sheath region having a cross sectional area;
    a plug sleeve comprising a solid parallelopiped, polished, flat surfaced base, and an elastic upper portion located above said base and attached thereto and having a longitudinal flare decaying in a direction away from each end face of said plug sleeve, wherein said upper portion exerts an inward compressive force directed toward said base;
  a longitudinal opening centrally extending between the base and the upper portion of said plug sleeve to accommodate the incident light conductive fiber, wherein said opening is externally flared at a periphery of said upper portion and adapted at a center of the plug sleeve to facilitate its interfacing with a corresponding cross sectional area; and
  a corresponding light conductive means disposed within said plug sleeve interfacing directly opposite with the cross sectional area of the light conductive fiber.

12. A coupling assembly as defined in claim 11, wherein said terminal equipment is integrally assembled together with the plug sleeve.

13. A coupling assembly as defined in claim 11, wherein said core regions of the light conductive fibers have a circular cross sectional area.

14. A coupling assembly as defined in claim 11, wherein said plug sleeve further comprises a plurality of serially connected longitudinally flared convex upper portions to allow for the reception of a plurality of corresponding light conductive fibers and corresponding light conductive means.

15. A coupling assembly as defined in claim 10, wherein the plug sleeve further comprises an optical slab or strip waveguide arranged on the base of said plug sleeve.

16. A coupling assembly as defined in claim 11, wherein said cross sectional area of said core region further comprises a straight base located parallel to the straight base of said annular cross sectional area of the sheath region.

17. A coupling assembly as defined in claim 16, wherein said core region of the light conductive fiber has have a rectangular cross sectional area.

18. A coupling assembly as defined in claim 16, wherein said core region of the light conductive fibers have a triangular cross sectional area.

19. A coupling assembly as defined in claim 16, wherein said core region of the light conductive fiber has have a semi-circular sectional area.

20. a coupling assembly as defined in claim 11, wherein said light conductive means comprises a transmitter having an internal face connecting said plug sleeve with said terminal equipment.

21. A coupling assembly as defined in claim 20, wherein said plug sleeve further comprises a means having an immersion liquid within.

22. A coupling assembly as defined in claim 21, wherein said immersion liquid includes an adhesive to maximize coupling efficiency between said conductive fiber and said transmitter.

23. A coupling assembly as defined in claim 21, wherein said means having an immersion liquid within is arranged between internal terminal faces of said light conductive fibers and said transmitter disposed in said plug sleeve.

* * * * *